May 27, 1969     C. R. HILPERT     3,446,323
CLUTCH PLATES HAVING MEANS TO PREVENT FLUTTER
Filed June 2, 1967
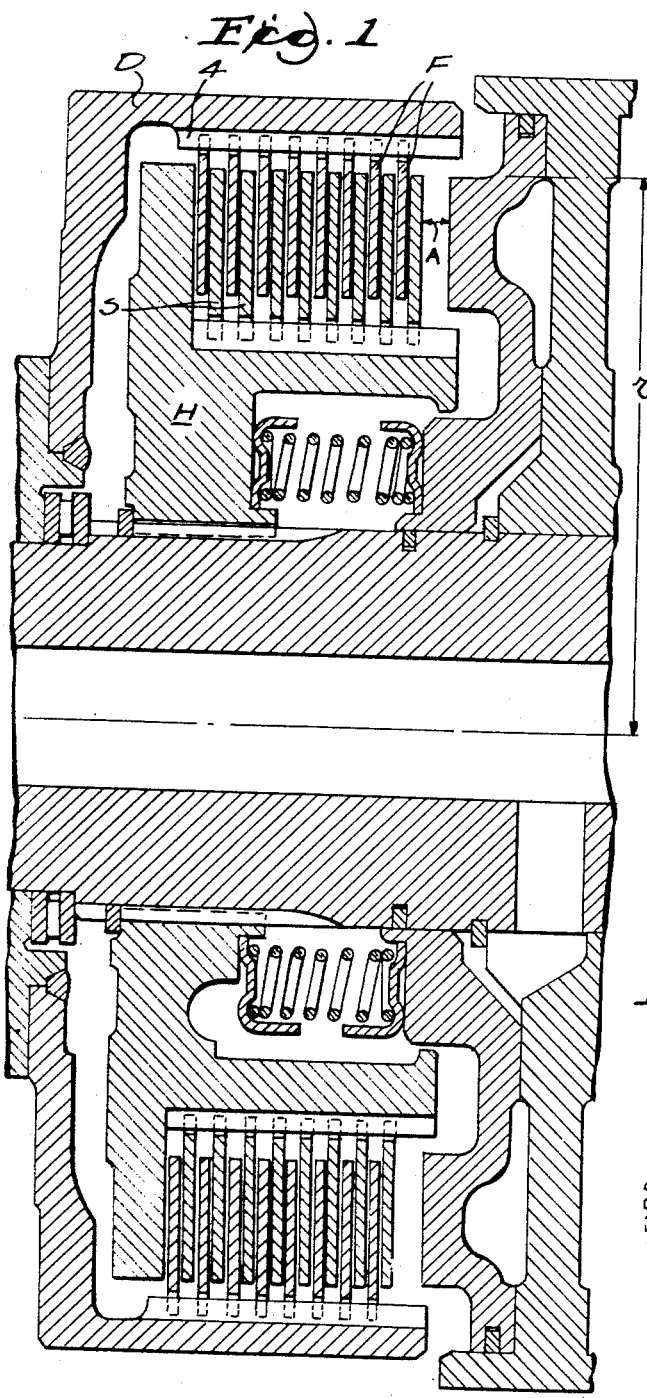
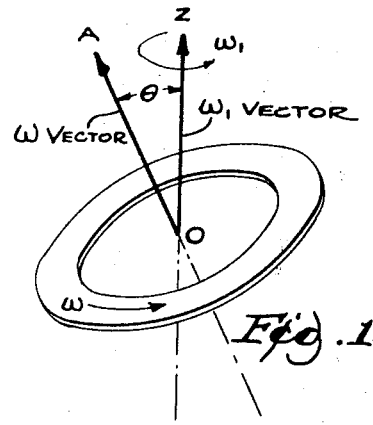
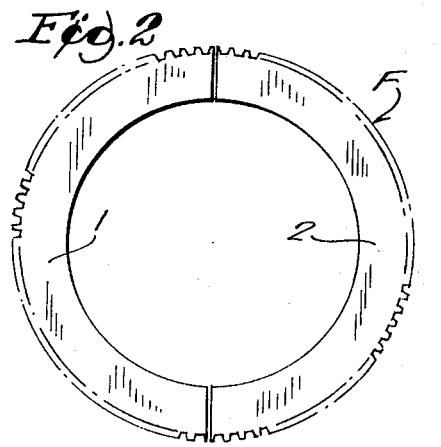
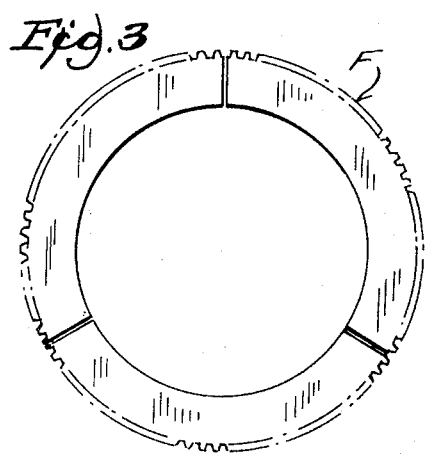
INVENTOR:
CONRAD R. HILPERT
BY: James E. Nilles
ATTORNEY

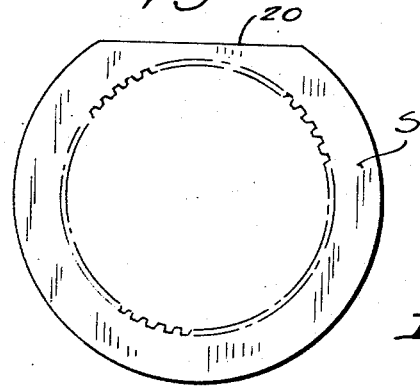
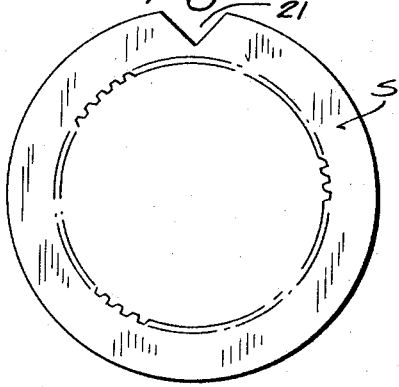
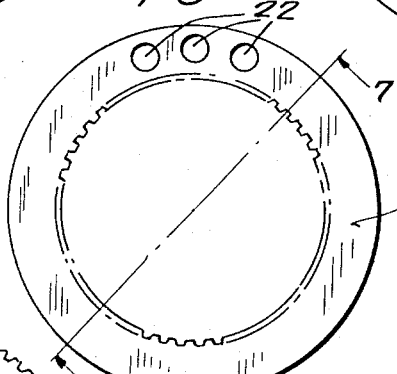
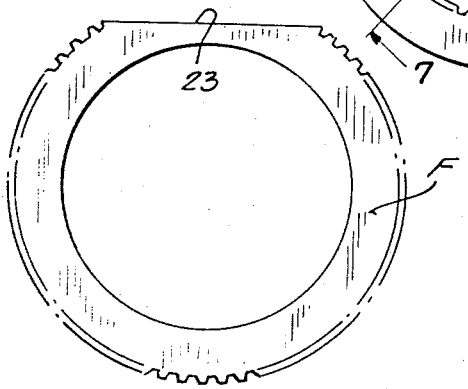
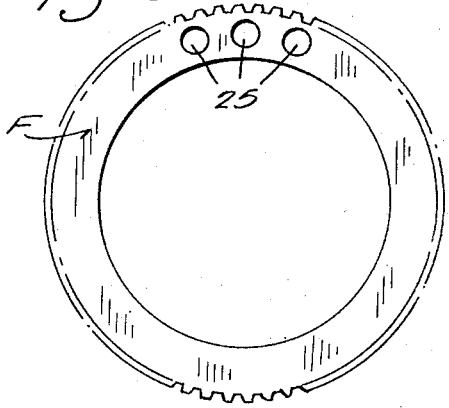
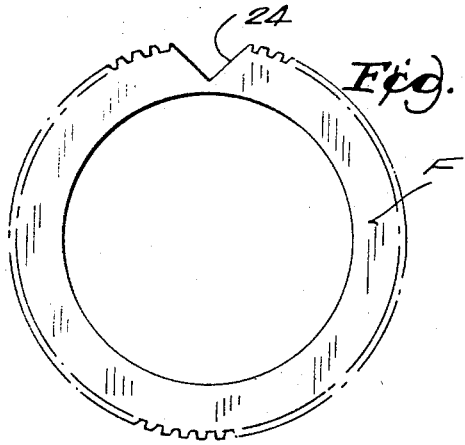

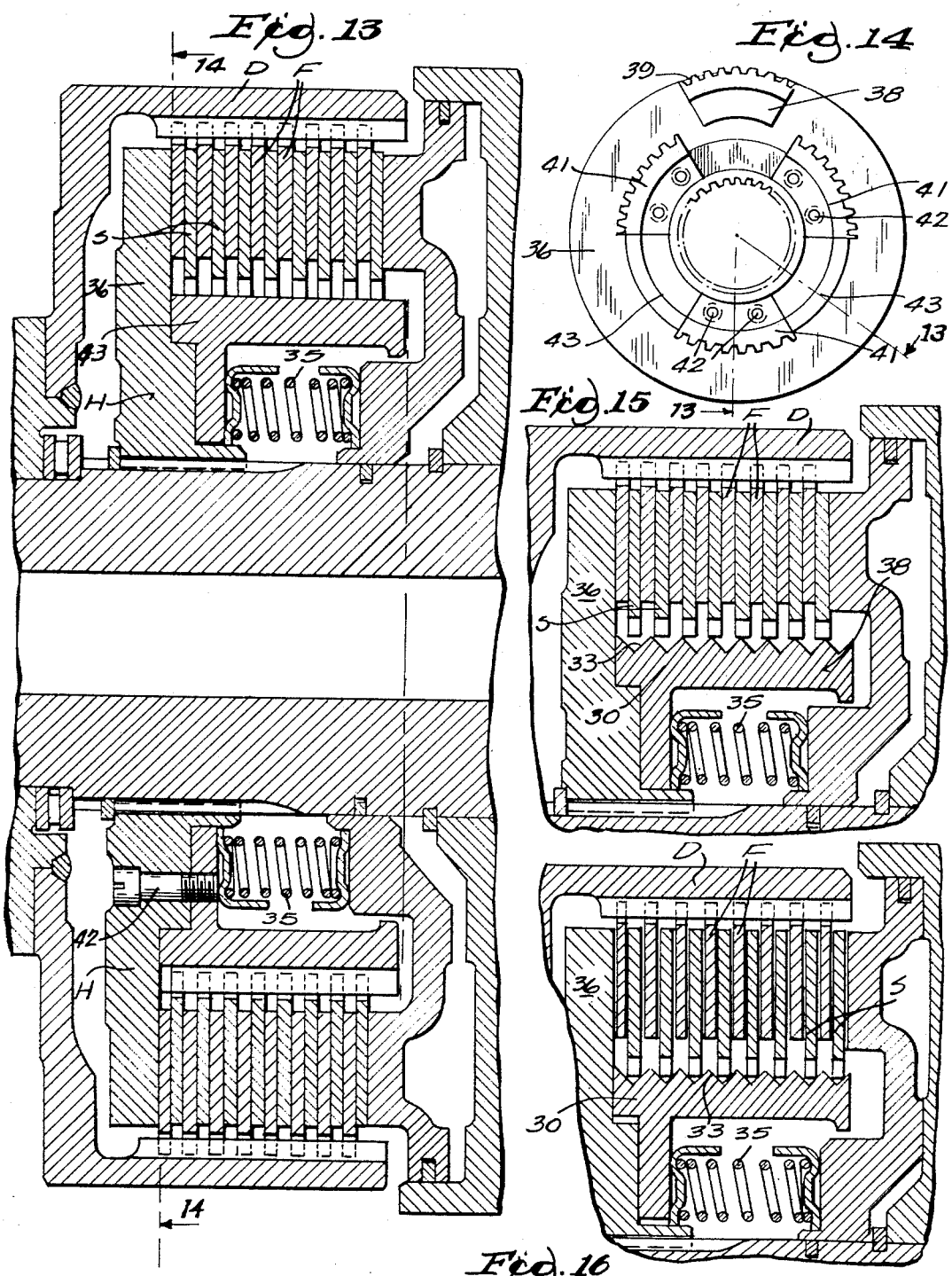

May 27, 1969 C. R. HILPERT 3,446,323
CLUTCH PLATES HAVING MEANS TO PREVENT FLUTTER
Filed June 2, 1967 Sheet 5 of 5

INVENTOR:
CONRAD R. HILPERT
BY: James E. Nilles
ATTORNEY

United States Patent Office 3,446,323
Patented May 27, 1969

3,446,323
CLUTCH PLATES HAVING MEANS TO PREVENT FLUTTER
Conrad R. Hilpert, Winnebago, Ill., assignor to Twin Disc Clutch Company, Racine, Wis., a corporation of Wisconsin
Filed June 2, 1967, Ser. No. 643,245
Int. Cl. F16d 13/22, 11/04, 23/10
U.S. Cl. 192—70.11                               3 Claims

ABSTRACT OF THE DISCLOSURE

Means for preventing disengaged clutch plates from fluttering, that is, from wobbling like a coin that is coming to rest after it has been spinning on its edge. This gyroscopic instability, caused when the plates do not rotate in a plane normal to the clutch axis, occurs when alternate plates rotate in opposite directions.

BACKGROUND OF THE INVENTION

Friction plate clutches which have interleaved friction plates, and the alternate plates of which rotate in opposite direction, present serious problems due to flutter, wobble or gyroscopic instability of the plates. This flutter can occur in either the externally toothed plates connected to the interior of the clutch drum or in the internally toothed plates connected to the central hub of the clutch, or both; it is usually more prevalent in the externally toothed plates. When the clutch is supposed to be running in a disengaged position, plate flutter may suddenly cause a great increase in drag torque, thus causing extreme heat and burned plates, lock up of the clutch and total destruction.

When the usual symptoms of flutter occurred in the prior art, common practices to attempt to eliminate the symptoms were to grossly increase the amount of cooling oil flowing past the plates, or insert small springs between the plates. While these practices did provide some improvement under certain conditions, they were not generally satisfactory.

SUMMARY OF THE INVENTION

The present invention provides means for eliminating flutter in counter rotating clutch plates by limiting or damping axial movement of the plates in their drums or on their hubs.

In clutch plates having external teeth, one means for preventing flutter is to split the plates into a plurality of pieces or segments, thereby causing frictional damping of axial movement at the external teeth of the plate. In other words, splitting of the plates causes their unbalance, permitting centrifugal force to cause high frictional dampening against axial movement between the external teeth of the plates and the axial grooves in which they are located. A more specific aspect of this phase relates to the circumferential positioning of the lines of split in one clutch plate relative to the lines of split in adjacent plates.

Another means provided for providing unbalance of either the external or internal toothed plates, or both, and consequent high frictional damping against axial movement, is to circumferentially unbalance the weight of the plates. This unequal weighting may be accomplished by removing a portion from one side of the plates, for example, by drilling holes, forming notches or by cutting along a chord and removing a portion from adjacent the periphery of the plate.

The invention also contemplates the use of split or otherwise unbalanced external teeth plates together with unbalanced internal teeth plates.

Still another aspect of the invention relates to the use of "coned" (that is, slightly dish-shaped) plates to reduce maximum axial "runout," (that is total axial displacement of the clutch pack), together with plates of the above mentioned unbalanced type.

Clutch flutter can also be prevented by using external tooth plates of the split type together with internal toothed plates mounted on their hub which is formed on a "skew" or at an angle to the clutch axis. The "skewed" hub, on which the internal toothed plates are mounted, causes a very high level of excitation to flutter of the external toothed plates, but the latter's split design prevents flutter by the high frictional damping at their external teeth as previously described. Stated otherwise, the skewed hub forces the internal tooth plates to bump the external tooth plates into normal alignment to the clutch axis, and the friction caused by the unbalanced segments of the external tooth plates will hold them in position and prevent flutter. This combination may be desirable under circumstances where the split or segmented externally toothed plates would cause flutter of the internal toothed plates. Such a combination of split, external tooth plates and a skewed hub for the internal toothed plates, prevents the clutch from going to the "inverted" flutter, that is, flutter of the internally toothed plates. In other words, this combination insures that the clutch will go to the "normal" flutter condition which can be eliminated with the split design of the external toothed plates.

Another means for preventing flutter of the internal toothed plates are centrifugal weights on the hub which restrain axial movement of these plates either mechanically or by friction. For example, these centrifugally actuated weights may be notched on their periphery to receive and guide the internal periphery of the plates, thereby properly spacing and mechanically holding these plates. The weights may also be of the smooth type which are centrifugally actuated to cause high frictional damping between the internal teeth and the hub splines in which they are mounted. In either the notched or smooth type cenrifugal weights, they may be spring biased toward the clutch backing plate.

Various combinations of the above means may be used in accordance with the present invention.

These and other objects and advantages of the present invention will appear as this disclosure progresses.

BRIEF DESCRIPTION OF THE DRAWINGS

FIGURE 1 is a longitudinal, cross sectional view through a hydraulically actuated friction clutch utilizing the present invention;

FIGURE 1a is a diagram of certain forces as applied to a clutch plate;

FIGURES 2 and 3 are transverse views, on a reduced scale, of externally toothed clutch plates used with the present invention;

FIGURES 4 to 6 are views of internally toothed clutch plates showing various ways in which material may be removed therefrom to result in unequal weighting or unbalance of these plates;

FIGURE 7 is a sectional view taken along lines 7—7 in FIGURE 6 and showing the "coned" shape of these internally toothed plates;

FIGURES 8 to 10 are views similar to FIGURES 4 to 6 but the unbalance being applied to externally toothed plates;

FIGURE 13 is a longitudinal, cross sectional view through a hydraulically actuated friction clutch which embodies the smooth type centrifugal weight modification of the invention;

FIGURE 14 is a transverse, sectional view taken along line 14—14 in FIGURE 13, but on a reduced scale, and with one of the radially shiftable weights being shown in an "exploded" or removed position for the sake of illustration;

FIGURES 15 and 16 are fragmentary views similar to FIGURE 13 but showing the notched or grooved type of centrifugal weight, in the clutch engaged and disengaged positions, respectively;

DESCRIPTION OF THE PREFERRED EMBODIMENTS

Figure 11:
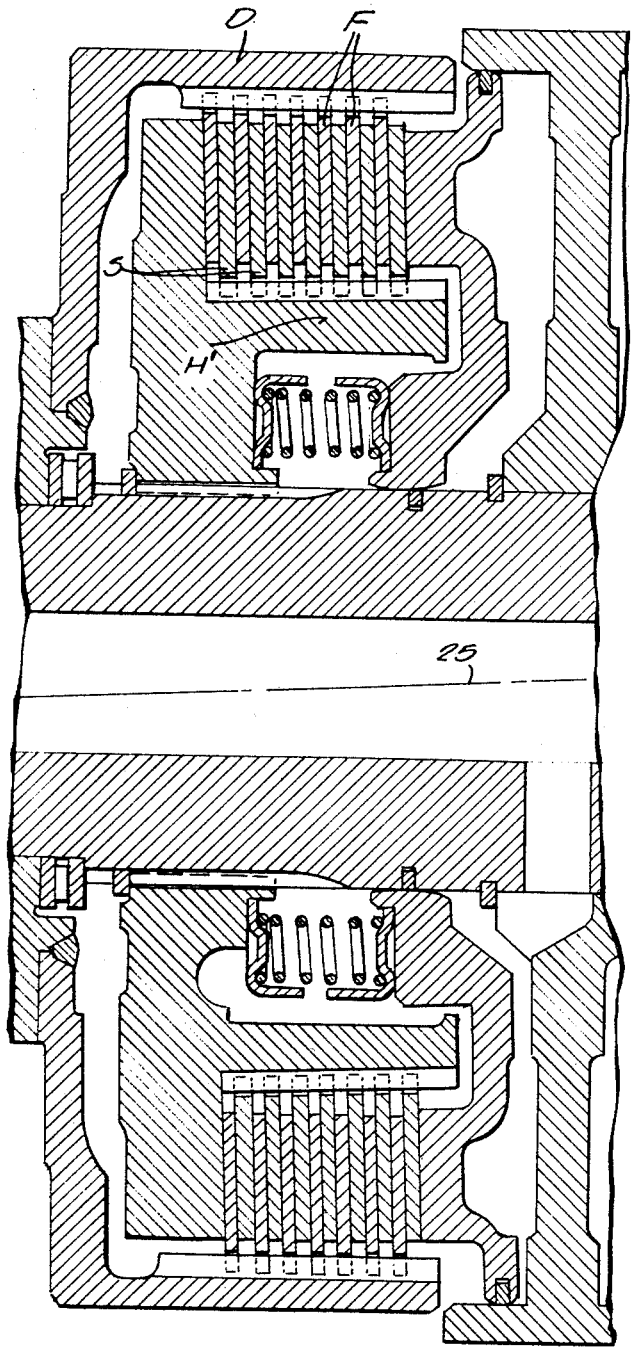
FIGURE 11 is a longitudinal, cross sectional view through a hydraulically actuated friction clutch and showing the skewed hub form of the invention.

The following description will be directed to a friction clutch of the type having interleaved clutch plates.

Some of these plates have external teeth around their outer periphery which are rotationally fixed in an internally splined or grooved clutch drum. These plates will be referred to as externally toothed plates and are usually faced with a waffle pattern for cooling and wear purposes. Flutter of those externally toothed plates may be referred to as "normal" flutter.

The other plates are internally toothed plates and are axially slidably on the splines of a clutch hub and are sometimes referred to as steel plates. These plates may be "coned," that is slightly dished-shaped, say 0.010 to 0.015 of an inch across the width of their ring, and this "coning" reduces the maximum possible "run out." Run out is the axial distance the plates and the actuating member must move to cause clutch clamp-up. These coned plates flatten out when clamped up. Flutter of these plates may be referred to as "inverse" flutter.

Plate flutter occurs when the clutch is disengaged in counter-rotating clutches, that is, where one set of plates rotates in one direction and the alternate plates rotate in the opposite direction and it is to this environment that the present invention is directed.

Flutter is a term which will be used herein to describe the movement of the plates in rotating in a plane other than normal to the clutch axis and with a whirl or wobble. Perhaps flutter can best be described as similar to the action of a coin that had been set on its edge and spun, and then starts to come to rest by "walking around" on its rim, in one location. This flutter can increase the torque of the clutch when it is supposed to be released, and causes burn out of the plates, and damage to the entire clutch and associated parts.

Flutter is due to "gyroscopic instability" of the plates, and is not (as previously thought by many skilled in the prior art) due to "hydrodynamic pumping action" of the plates. Flutter symptoms could be eliminated by the simple expedient of gross increases in cooling oil flow between the plates, but on the other hand flutter also existed when no cooling oil flow occurred.

It may also be helpful at this juncture to discuss Euler's equation of motion in connection with an explanation of clutch flutter. As found in S. Timoshenko and D. H. Young's book "Advanced Dynamics," (first edition, chapter V, page 346, Figure 260, Equation 170, McGraw-Hill, New York (1948)) this equation is as follows:

$$-Mn = -[Iw + (I - I_1)w_1 \cos \theta]w_1 \sin \theta$$

Reference is also made to FIGURE 1a of the drawings which shows a diagram of these forces as applied to a clutch plate.

In the above equation, the symbols are defined as follows:

$Mn$ = Moment in AOZ plane tending to change value of $\theta$
$I$ = Moment of inertia of disc about disc axis (AO)
$I_1$ = Moment of inertia of disc about a diameter
$w$ = Rotational velocity of disc about disc axis (AO)
$w_1$ = Rotational velocity of disc axis about intersecting and inclined axis (ZO)
$\theta$ = Angle between disc axis (AO) and inclined axis (ZO).

The above formula may be applied to a clutch and in this respect reference is made to FIGURE 1 of the drawings where the clutch drum D has the externally tooth disc plates F fixed thereto for rotation therewith but for axially sliding relative thereto in the known manner. The clutch hub H has the internally toothed discs S similarly splined thereto for axially sliding on the hub and for rotation therewith. The total indicated runout or wobble of the discs is the total clearance and is indicated generally by the reference A. The radius of the discs at the maximum outside diameter of contact is indicated by $r$. $W_D$ is the rotational velocity of the drum, and $W_H$ is the rotational velocity of the hub.

Applying the previously mentioned Euler's equation of motion to the clutch shown in FIGURE 1, or as described in this specification, let:

$$Mn = F \text{ times } 2r$$

where:

F is a force acting at opposite ends of a diameter and producing a tilting moment
$W_1 = W_H$
$W = W_D - W_H$ (for disc F)

$$\sin \theta = \frac{A}{2r}$$

$$\cos \theta = \sqrt{1 - \frac{A^2}{4r^2}} = (\text{approx. } 1)$$

For discs F:

$I = I_{\text{Face}}$ (polar moment of inertia)
$I_1 = I_{1F}$ (plane moment of inertia)
$I_F = 2I_{1F}$ (approx.)

For discs S:

$I = I_S$
$I_1 = I_{1S}$
$I_S = 2I_{1S}$ (approx.)

From the above equations, it will be seen that normal flutter, the force that the inner tooth plates exert to straighten themselves, will be defined as follows:

$$F_S = I_S W_H^2 \frac{A}{8r^2}$$

Thus the force $F_S$ is a force which tends to cause the plates S to straighten up in exactly normal to the center line of the hub.

The force which the internal tooth plates exert to cause flutter can be defined as follows:

$$F_F = I_F W_D W_H \frac{A}{4r^2} - I_F W_H^2 \frac{A}{8r^2}$$

Thus force $F_F$, depending on the sense of $W_D$ and the magnitude of $W_D$, will be a force tending to increase tilt or straighten up the plates.

The forces $F_S$ and $F_F$ can be added together since the plates F and S are located together and can act on each other (and the polar and plane moments of inertia of the plates are equal, $I_F=I_S$, as they are in an actual plate), this addition will obtain the force of the flutter, for example:

$$F_F+F_S=I_F W_D W_H \frac{A}{4r^2}-I_F W_H^2 \frac{A}{8r^2}+I_S W_H^2 \frac{A}{8r^2}$$

Thus, the sum of the forces is as follows:

$$F_{(normal\ flutter)}=I_F W_D W_H \frac{A}{4r^2}$$

If the total force F is negative, the plate stack will tend to tilt more, and if the value is positive, the plate stack will tend to straighten up. Thus, it will be seen that the plate stack will have flutter if the hub and drum counter-rotate and any runout A is impressed upon them.

"Inverted" flutter is arrived at in the same manner and is defined as:

$$F_{(inverted\ flutter)}=I_S W_H W_D \frac{A}{4r^2}$$

FIGURES 1 to 3

I have found that flutter can be prevented by unbalancing the discs F, this unbalance creating friction on the external teeth which in turn prevents movement of the discs F in axial direction, and consequently prevent "normal" flutter mode.

Referring in greater detail to FIGURES 1–3, means are provided by the present invention for creating the necessary frictional forces at the external teeth of the plates F. This means consists in forming the externally toothed plates as a number of segments, that is splitting the disc, preferably into two halves as shown in FIGURE 2. Other numbers of segments may be used, say for example three (see FIGURE 3), but numbers greater than this are undesirable because the individual pieces tend to spin or turn on their own individual axes. As shown in FIGURE 2, the externally toothed discs F are split in two halves 1 and 2, and centrifugal force causes these halves to move outwardly, thus creating frictional forces of the teeth against their grooves or splines 4 in the clutch drum D. I have found by so splitting the discs, maximum unbalance and consequent friction results. The splits in the plates F must be orientated relative to those splits in other plates F, and I have found that it is desirable to locate these splits of one plate 90° out of phase with those of other discs, that is those adjoining discs. Other degrees of out-of-phase may be used, for example, dividing 360 degrees by the number of plates and then orienting the plates around the circle accordingly. This insures that an axis for inverted flutter is not presented, and that the entire centrifugal force of all the split plates is not concentrated on any two locations of the drum. As mentioned, the splits in the plates F can be placed at angles other than 90° to one another to relieve stresses in the drum, and the minimum drum stress would occur when no two splits are aligned.

Furthermore, as will appear later, the groupings of the various types of unbalanced plates along the length of the clutch must be such that dynamic balance along the clutch length is assured and "shaking" of the clutch prevented.

I have found that by splitting and arranging the plates as above mentioned, normal flutter is prevented under many circumstances. Under other circumstances it may be necessary or desirable to combine the above mentioned split plates with other types of unbalance and these will now be described.

I am aware that clutch plates have been split, per se, to facilitate assembly or to eliminate torsional vibration rattle.

It may be mentioned that the plates S cannot be split, as above described for plates F, in order to achieve this unbalance, because centrifugal force acts to actually disengage the internal teeth of the plate S from the hub, contrary to the desired result.

FIGURES 4 to 10

In FIGURES 4 to 10, means for unbalancing either of the plates F or S are provided by the present invention.

I have found that shifting the weight of the plates S so that they are unbalanced as to weight, creates the necessary friction on their internal teeth with the hub H so that axial movement is damped. This arrangement is shown in FIGURES 4 to 7 where portions 20, 21 and 22 are cut out from the plates at one side thereof.

FIGURES 8 to 10 show similar portions 23, 24 and 25 cut out from externally toothed plates F.

In this manner, either the internal or external toothed plates, or both, may in accordance with the present invention, be unbalanced by shifting their weight out of concentricity, that is for example, by removing a portion of the metal from one side of the plates, that is, from circumferentially unequal portions.

Either splitting the plates F, as previously described, or by unbalancing plates F or S, or both, by shifting their weight (that is by removing metal, for example), not only is the necessary friction created to eliminate flutter, but in addition it forces the plates to rotate normal to the centerline of the clutch. That is to say, centrifugal forces cause the heavier side to straighten the plates.

Figure 12:
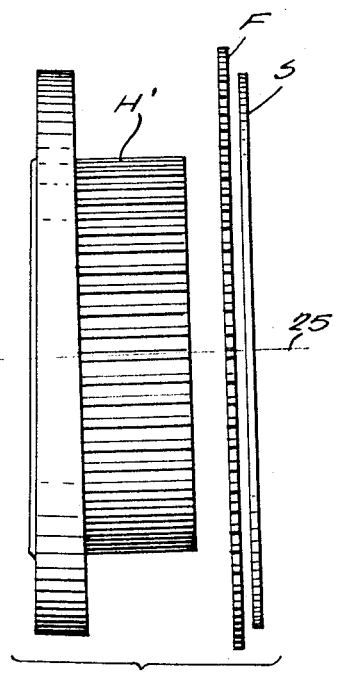
FIGURE 12 is an elevational view of the skewed hub as shown in FIGURE 11, together with a pair of plates usable therewith.
Figure 17:
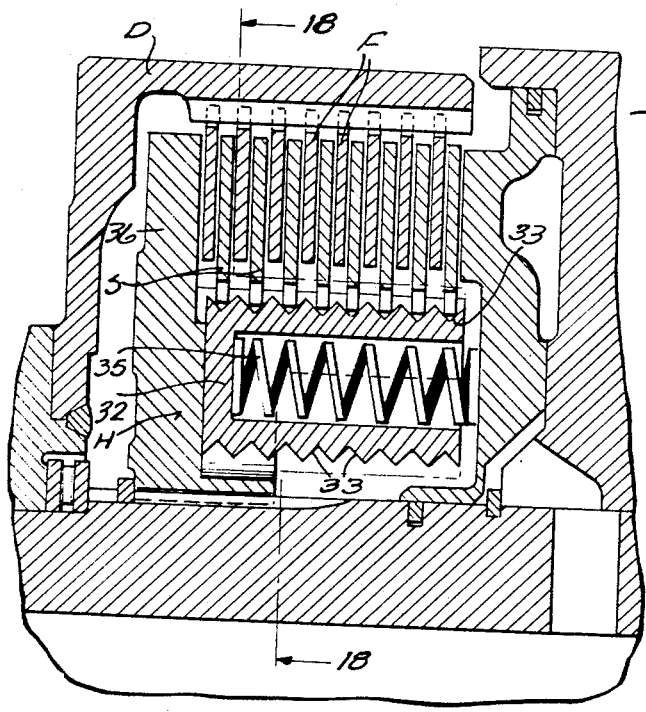
FIGURE 17 is a view similar to FIGURE 16, but showing a grooved roller type of centrifugal weight, and with the clutch in the disengaged position.
Figure 20:
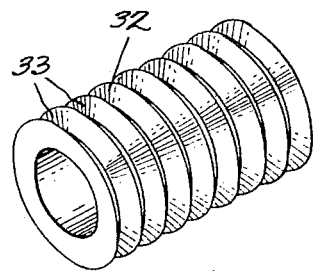
FIGURE 20 is a perspective view of the roller shown in FIGURE 17.
Figure 18:
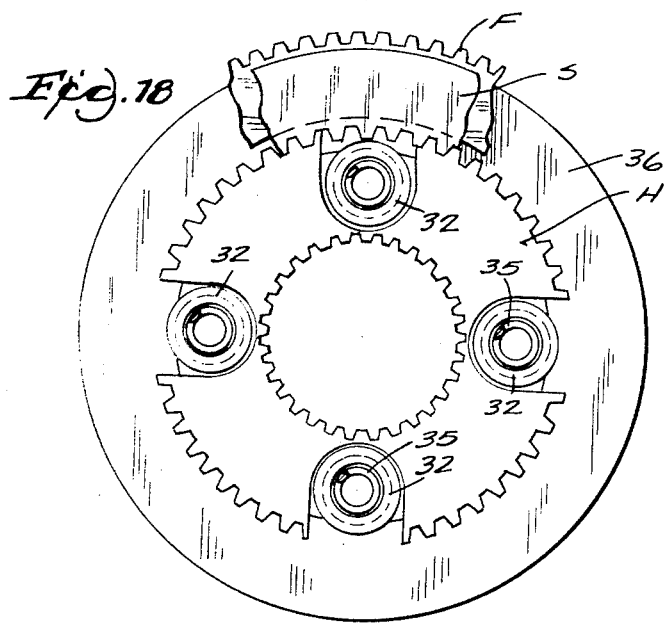
FIGURE 18 is a cross sectional view taken generally along line 18—18 of FIGURE 17, certain parts being shown as broken away or removed for clarity in the drawings and in the clutch engaged position.
Figure 19:
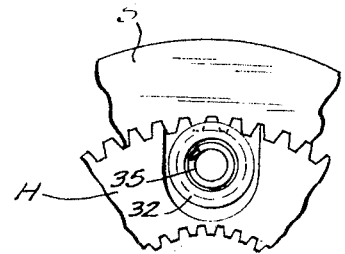
FIGURE 19 is a fragmentary detail view of a portion of the FIGURE 18 device but with the clutch in the disengaged position and thus the roller in a radially outward position.

FIGURES 11 and 12

Means are provided for purposely causing normal flutter, i.e., slanting of the plates mounted on the hub, in combination with split plates mounted on the drum, so that the clutch positively will be characterized by a normal flutter which can be eliminated, rather than characterized by an "Inverted" flutter. This is accomplished by skewed or inclining the hub H' along the axis 25 (FIGURE 11) on which the internal toothed plates S are mounted, which positively causes flutter thereof that in turn causes a very high level of excitation to "normal" flutter operation. In other words, the wobbling hub plates S bump the split plates F into normal alignment or zero runout and the friction generated by the split plates F holds them in this aligned position.

FIGURES 13 to 20

Other means, such as centrifugally actuated and radially shiftable weights mounted on the hub H, may be urged against the internally toothed plates S to hold them in alignment. A spring 35 urges the weights, along with the associated plates, in an axial direction against the back up member 36 of the clutch hub H.

The grooved weights 30 or 32 shown in FIGURES 15, 16 and 17–20, respectively, mechanically hold the plates S in properly spaced relationship and resiliently prevent axial movement or flutter of these plates S. The grooved weights are urged into contact with the plates S which then seat themselves in the grooves 33, thus holding the plates S captive in the grooves and properly separated where they cannot shift axially and flutter. When the clutch is engaged, the weights are urged radially inward against centrifugal force, permitting clamp up of the clutch.

As shown in FIGURES 13 and 14, other pie-shaped weights 38, without grooves, may be urged by centrifugal force against plates S to thereby create the necessary frictional forces to prevent axial shifting or flutter of plates S. This ungrooved weight 38 (FIGURE 14) may simply have longitudinal splines 39 on its periphery to match the rest of the splines of the hub members 41 fixed by bolts 42 to the hub proper, so as to firmly push against the teeth of plates S, or it may be entirely smooth as is segment weight 43 (FIGURE 14).

I claim:
1. In a counter-rotating, interleaved friction plate clutch of the type having a rotatable drum member and a rotatable hub member, said drum and hub rotating in opposite directions when said clutch is disengaged, externally toothed plates mounted for axial sliding on the interior of said drum and for rotation therewith, internally toothed plates axially slidable on said hub for rotation therewith, and means to cause axial shifting of said plates between clutch disengaged and engaged positions, the improvement comprising means for causing unbalance of at least some of said plates to thereby create frictional forces between the teeth of at least some of said plates and the member on which they are mounted to thereby dampen axial flutter movement of said plates when said clutch is in a disengaged position, said means comprising said plates having portions removed from circumferentially unequal portions thereof to cause unbalance of said plates, said removed portions extending only partially across the width of said plates whereby said plates are continuous around their circumferential length to prevent said plates from splitting open due to centrifugal force.

2. The clutch as claimed in claim 1 further defined in that both the internally and externally toothed plates have said portions removed from along only a portion of their circumferential length to cause weight unbalance of said plates.

3. The clutch as defined in claim 1 further characterized in that said internally toothed plates are slightly dish-shaped.

References Cited

UNITED STATES PATENTS

| | | | |
|---|---|---|---|
| 814,132 | 3/1906 | Hele-Shaw | 192—107 XR |
| 860,590 | 7/1907 | Williams | 192—107 XR |
| 1,017,762 | 2/1912 | Jones | 192—107 XR |
| 2,193,524 | 3/1940 | Thompson | 192—107 XR |
| 2,330,856 | 8/1943 | Adamson | 192—107 XR |

FOREIGN PATENTS 660,360   5/1938   Germany.

BENJAMIN W. WYCHE III, *Primary Examiner.*

L. J. PAYNE, *Assistant Examiner.*

U.S. Cl. X.R.

192—103, 107